C. W. LASSERRE.
BROAD GAGE ATTACHMENT FOR VEHICLES.
APPLICATION FILED SEPT. 30, 1916.
1,313,394.
Patented Aug. 19, 1919.
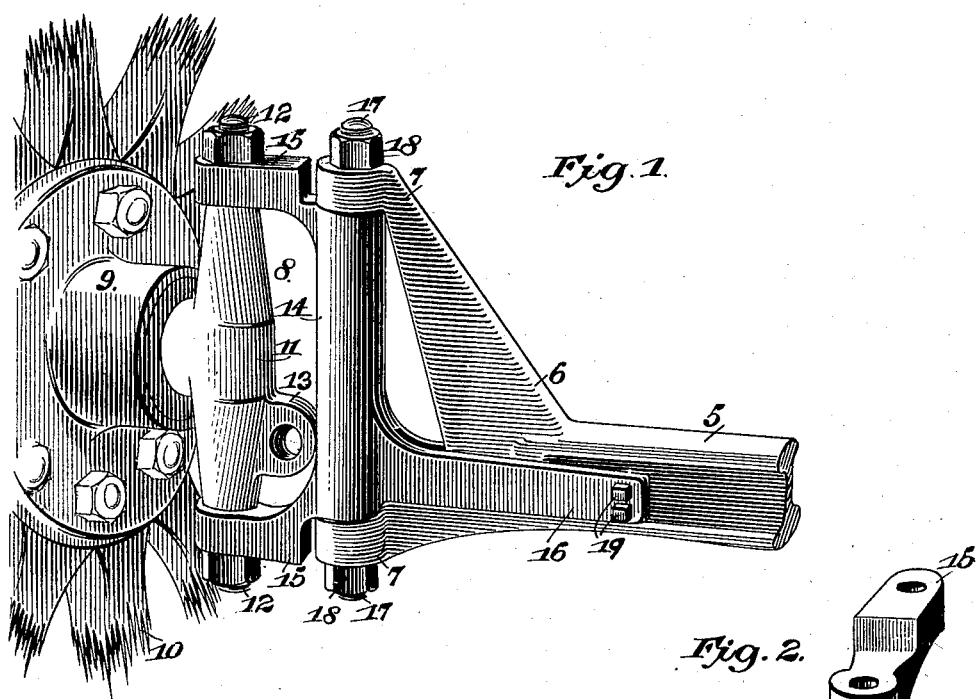
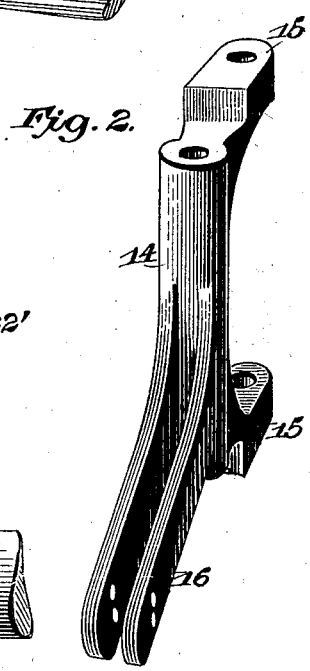
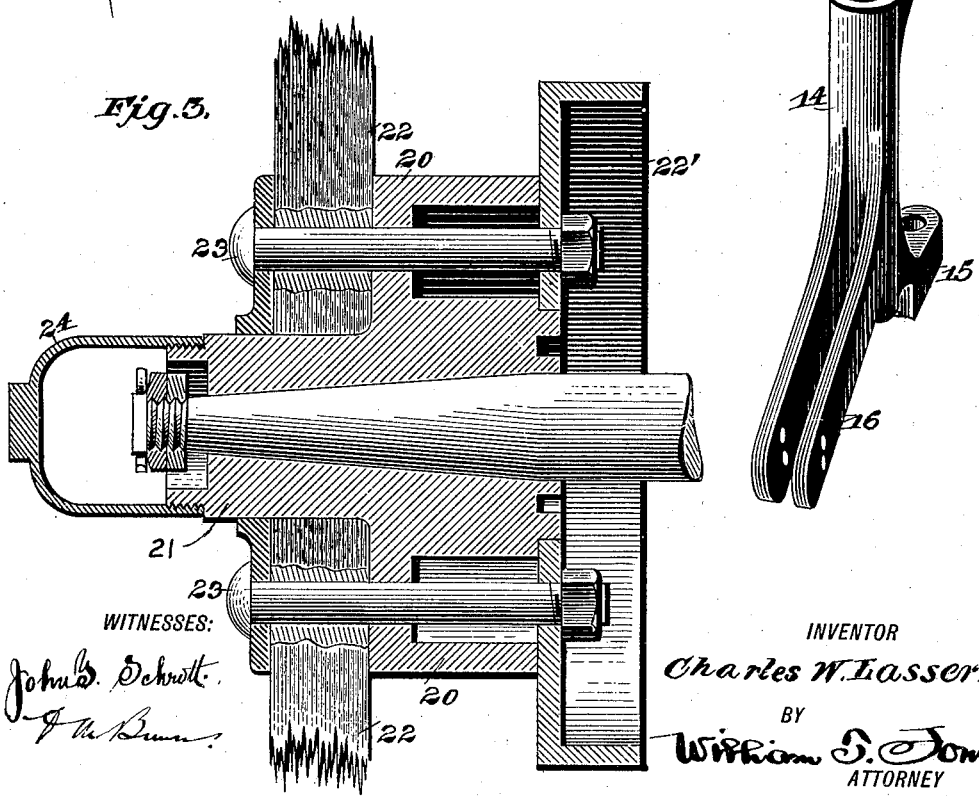
INVENTOR
Charles W. Lasserre
BY
William S. Jones
ATTORNEY

UNITED STATES PATENT OFFICE.

CHARLES W. LASSERRE, OF FERNANDINA, FLORIDA.

BROAD-GAGE ATTACHMENT FOR VEHICLES.

1,313,394.     Specification of Letters Patent.     Patented Aug. 19, 1919.

Application filed September 30, 1916. Serial No. 123,059.

*To all whom it may concern:*

Be it known that I, CHARLES W. LASSERRE, a citizen of the United States, residing at Fernandina, in the county of Nassau and State of Florida, have invented certain new and useful Improvements in Broad-Gage Attachments for Vehicles, of which the following is a specification, reference being had therein to the accompanying drawings.

My invention relates to an attachment for increasing or broadening the gage of automobiles and similar vehicles, and has among its objects the provision of an attachment of the character described which may be quickly and easily installed; which may be manufactured and marketed at a price within the reach of all owners of such vehicles; which makes for maximum strength and durability; and which secures a marked reduction of the strain and wear imposed upon the component parts employed in the organization of the device.

The invention will be best understood in connection with the accompanying drawings which, merely for the purposes of illustration, show the particular form of the invention which I at this time regard as preferable of the various forms in which my invention may be embodied.

In said drawings:

Figure 1 is a fragmentary perspective view showing the application of the invention to the front axle of an automobile.

Fig. 2 is a detailed perspective view of the coupling, and

Fig. 3 is a central sectional view illustrating the manner of carrying out the invention with respect to the rear construction of an automobile.

Broadly, the invention comprehends the interposition of an extension coupling between the adjacent terminals of the main and stub axles for increasing the gage of the front wheels, and the employment of a combined spacing element and hub between the brake drum and spokes for broadening the gage of the rear wheels.

Referring more particularly to the drawings, 5 indicates the main front axle having the yoke or fork 6 with ears 7. 8 is the stub axle structure comprising a spindle 9 carrying a wheel 10, a vertical sleeve 11 and a pivot bolt 12. Steering mechanism may be articulated relative the ear 13 of the hub 11 in any well known way, in fact, all of the foregoing parts are of conventional type.

Between the yoke and stub-axle I interpose a bracket which consists specifically of a vertically elongated coupling 14 carrying a pair of terminally disposed eyes 15 and an oppositely arranged bifurcated extension 16. The coupling 14 is rigidly secured to the ears 7 by the bolt 17 and nuts 18, while the stub-axle structure is freely movable in a horizontal plane on the bolt 12 sustained by the ears 15. The bifurcated extension 16 straddles the fork 6 and a portion of the extremity of the main axle-beam at which latter point it is secured by set screws 19.

In attaching the coupling, it is simply necessary to disconnect the stub axle, connect the eyes 15 of the coupling to the stub axle and then tighten up on the set screws 19. When complete, the coupling will be equally as efficient as the original connection, thoroughly and positively braced against thrusts of any character, and devoid of any complicated parts. Such advantageous construction, combined with the added feature of securing an increase in the gage of the wheels, dependent, of course, upon the distance between the axial centers of the elongated coupling 14 and sleeve 11, constitutes a very valuable and much needed automobile accessory.

By virtue of the difference in arrangement and construction of the rear construction, it is necessary to use another type of device to effect a change in the gage of these wheels. As shown in Fig. 3 of the drawings, this device embodies a unitary spacing element 20 and a reduced hub portion 21, fastened between the spokes 22 and the brake drum 22′ by bolts 23. The spokes rest firmly in the seat or shoulder formed in annular fashion between the spacing element and the hub, and the latter is made of a length sufficient to accommodate the hub cap 24 to a nicety.

What is claimed, is:

1. In an attachment for increasing the gage of automobiles and similar vehicles, a main axle having a forked extremity, a deflected coupling member immovably fixed between the forked portions of said extremity, and a stub-axle mounted wholly between the deflected portions of said member.

2. In a device of the character described, the combination of a main axle having a forked extremity, a bifurcated coupling member fixed between the forked portions of said extremity and having at its base a pair of arms which straddle the main axle, means carried by said arms for engaging said axle at a point inwardly of the forked extremity, and a stub axle carried by said member.

In testimony whereof, I hereunto affix my signature, in the presence of two witnesses.

CHAS. W. LASSERRE.

Witnesses:
JOHN L. BENNETT,
K. A. McDONELL.

Copies of this patent may be obtained for five cents each, by addressing the "Commissioner of Patents, Washington, D. C."